INVENTORS.
James E. Dobmeier
Jack C. Zimmerman
BY
Charles W. Gregg
AGENT

INVENTORS.
James E. Dobmeier
Jack C. Zimmerman
BY Charles W. Gregg
AGENT

Oct. 20, 1970  J. E. DOBMEIER ET AL  3,534,593
FLEXIBILITY TESTING

Filed Oct. 30, 1968  10 Sheets-Sheet 7

INVENTORS.
James E. Dobmeier
Jack C. Zimmerman
BY
Charles W. Gregg
AGENT

United States Patent Office 3,534,593
Patented Oct. 20, 1970

3,534,593
FLEXIBILITY TESTING
James E. Dobmeier and Jack C. Zimmerman, Painted Post, N.Y., assignors to Corning Glass Works, Corning, N.Y., a corporation of New York
Filed Oct. 30, 1968, Ser. No. 771,747
Int. Cl. G01n *3/32*
U.S. Cl. 73—100                                         14 Claims

ABSTRACT OF THE DISCLOSURE

A method of and apparatus for, testing the flexibility of frangible panels, that is, whether such panels can withstand a selected degree of concave and convex flexing or bowing without fracture or breakage thereof. The apparatus comprises a rectangular lower or bottom frame support member including cross members adapted to be arranged in said frame to define areas corresponding to the size and shape of panels of selected sizes to be tested. Such cross members have along their upper surfaces resilient pads for support of the panels thereagainst. An upper or top member embodying a pressure chamber having a closed top portion is complementary to said bottom frame member and includes cross members similar to those of said bottom frame member and including hermetic resilient pads along the bottom surfaces of such cross member, such top member being hinged to the bottom frame member along corresponding sides of such members. Each panel to be tested is disposed on said frame member with portions of a first planar surface thereof, adjacent to the outer peripheral edges of the panel, contacting said pads or a portion of said pads on the cross members of the frame member. The upper memmer is then pivoted downwardly about said hinge or hinges so that the second planar surface of the respective panel to be tested contacts said pads on the cross members of the top or upper member in a hermetic relationship therewith and in a manner similar to that mentioned for the pads on the cross members of the frame member. Vacuum or negative pressure, and positive pressure are then alternately applied through the chamber in said upper member to said second planar surfaces of the respective panel to cause the panel to flex or bow as previously mentioned.

BACKGROUND OF THE INVENTION

It is oftentimes required that panels be tested to determine if they can withstand a prescribed degree of concave and convex flexing or bowing without fracture or breakage thereof. For example, outside walls of buildings are often clad or faced with relatively large panels of a decorative plastic material which are secured to the building only along the outer edges of each respective panel by a suitable support frame or similar means. The panel surfaces which are next to building walls which are so faced or clad are often spaced from such walls either for thermal insulation purposes or due to the structure of the type of panel support frames employed. Cladding panels so arranged or supported are sometimes subject to substantially extreme concave and convex bowing or flexing due to the force of high winds blowing against said panels and about the buildings clad or faced with such panels. Accordingly, following the manufacture of said panels, it is desirable to subject such panels to tests which give the effect of or simulate said bowing or flexing of the panels due to the most extreme or highest winds which may be encountered by the panels when they are mounted on outside walls of buildings as described. The apparatus and method of the present invention was developed to provide for such testing of the cladding panels.

SUMMARY OF THE INVENTION

In practicing the invention disclosed, there is provided a lower or bottom frame member and a top or upper member embodying a pressure chamber. Such members are complementary to each other and are hinged together along a corresponding side of each panel for closing of the top member downwardly against the outer periphery of the bottom member. Cross members are adapted to be arranged in both said members to define areas corresponding to the size and shape of panels of the aforementioned type which are to be tested, the bottom surfaces of the cross members of the top member being provided with resilient pads for hermetic sealing against the portions of the upper planar surfaces of said panels adjacent the outer perimeters of the panels when said members are closed. Conduit means are connected through the top of said top or upper member to selectively and alternately supply vacuum or negative pressure and positive pressure to said chamber and, thereby, to the upper surface of each said panel disposed therein and having said portions of its planar surfaces contacting said pads of the cross members to provide said hermetic sealing. Such alternate positive and negative pressures cause concave and convex flexing or bowing of each panel tested to determine whether the respective panel can withstand a selected degree of said flexing or bowing without breakage or fracture thereof.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
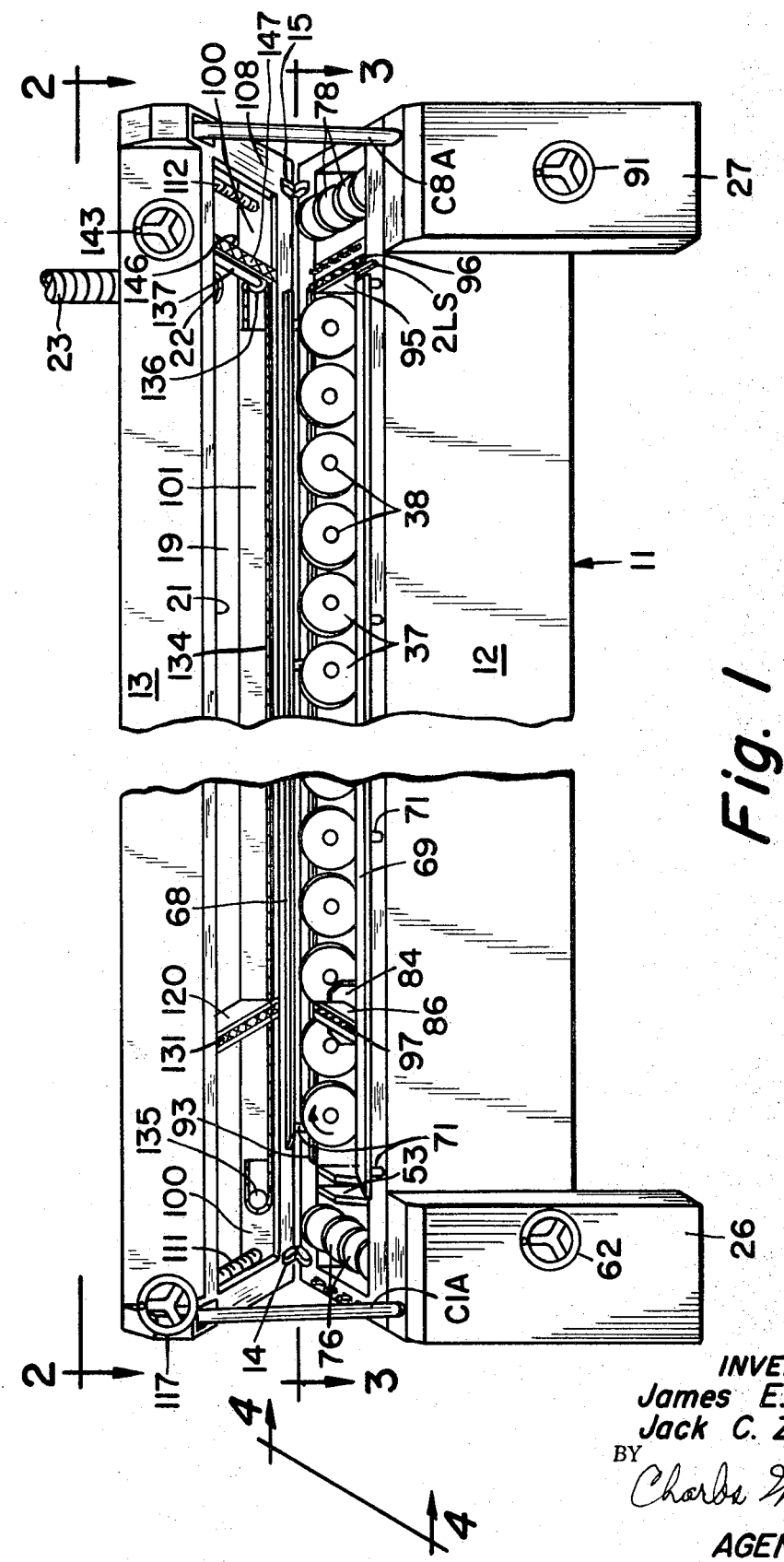
FIG. 1 comprises a perspective front view illustrating the apparatus embodying the invention.

Referring to the drawings in detail, there is shown in FIGS. 1 through 4 a panel flexibility testing apparatus 11 comprising a first, bottom or lower frame member 12 and a second, top or upper member 13, such members being arranged in a closable relationship with each other as by a pair of hinges 14 and 15 fastened in any convenient manner to said members to hinge the members to each other along the rear or one side thereof.

Figure 2:
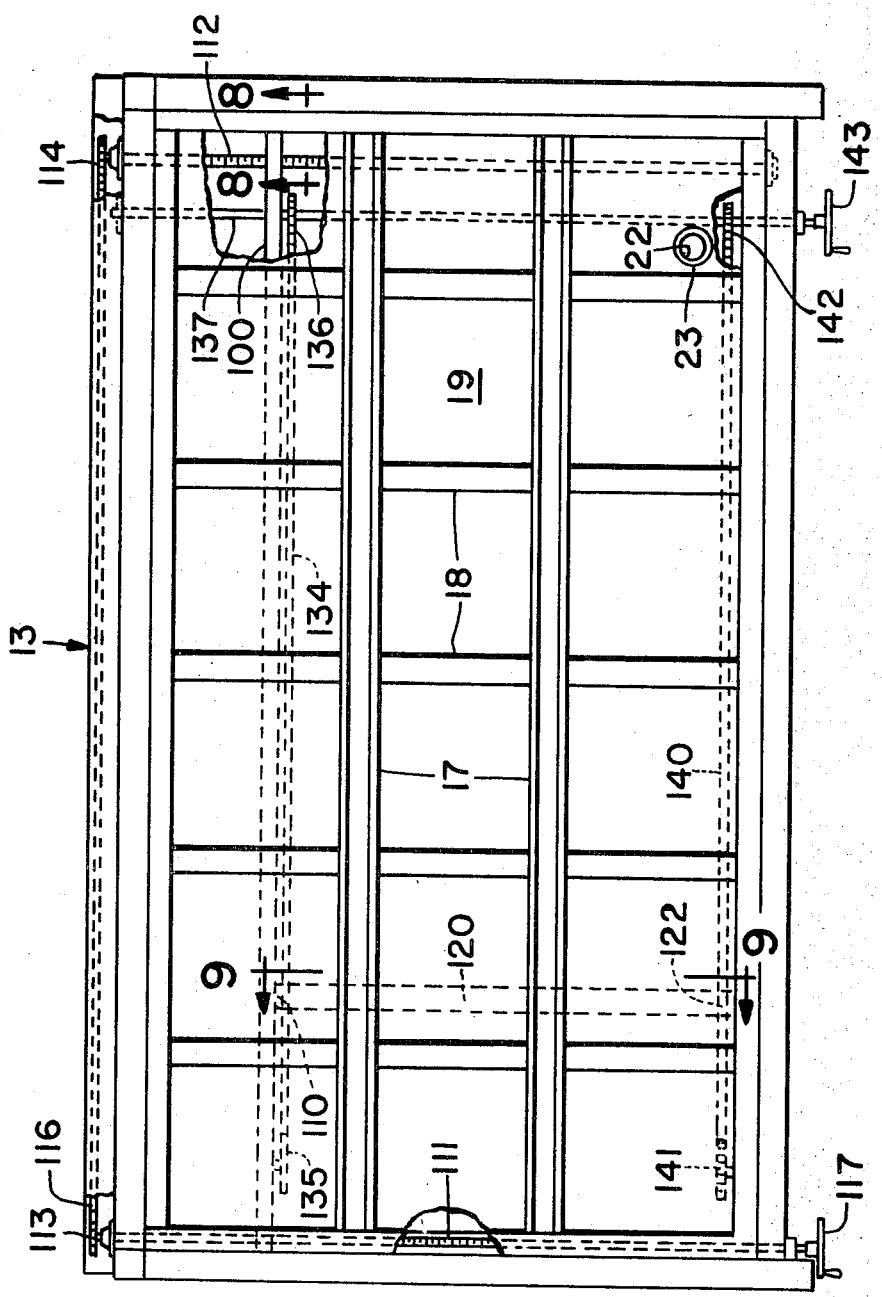
FIG. 2 is a top plan view of the upper part of the apparatus of FIG. 1 with parts thereof partially broken away to better illustrate the apparatus arrangement, such view being taken generally along line 2—2 of FIG. 1.
Figure 4:
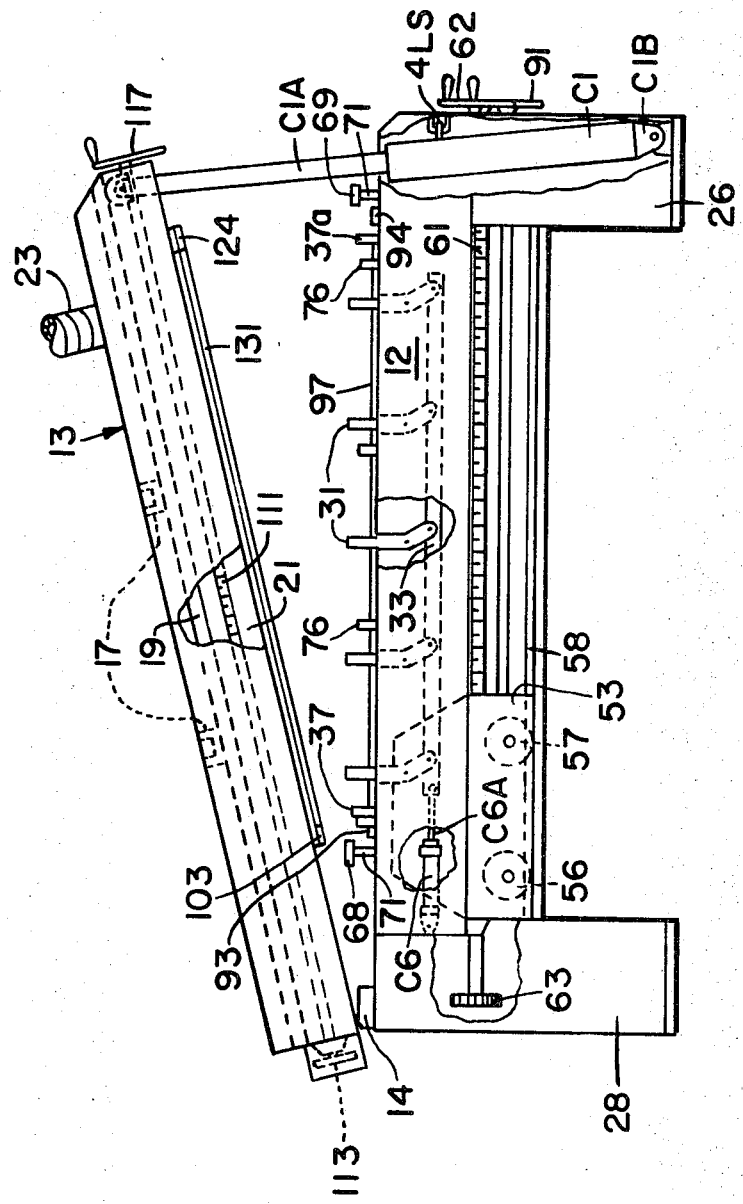
FIG. 4 is an elevational view of the left-hand end of the apparatus of FIG. 1, such view being taken generally along line 4—4 of FIG. 1.

The upper portion of the second or upper member 13 includes a plurality of cross pieces such as 17 and 18 (FIG. 2) which form a gridwork for firm or rigid bracing of the upper member. There is attached to the lower surfaces of the crosspieces such as 17 and 18, as by being welded thereto for example, a large flat plate 19 (FIGS. 1, 2 and 4) which forms an upper planar wall of an open-bottomed pressure chamber 21 (FIGS. 1 and 4) provided in the lower portion of member 13. Plate 19 is also fastened at its outer periphery to the inside surfaces of the outer frame of member 13 as by being welded to such surfaces and so that such outer frame forms the sidewalls of pressure chamber 21. Plate 19 embodies a hole or passage 22 (FIGS. 1 and 2) which extends through such plate and into which extends, in a hermetic relationship with the perimeter of the passage, one end of a flexible pressurized aeriform fluid hose or conduit 23 (FIGS. 1, 2 and 4). As will be discussed in detail hereinafter, the other end of fluid conduit 23 connects to a source of negatively and/or positively pressurized aeriform fluid. By a brief study of the drawings, the apparatus arrangement thus far described will be readily apparent to those skilled in the art.

Figure 3:
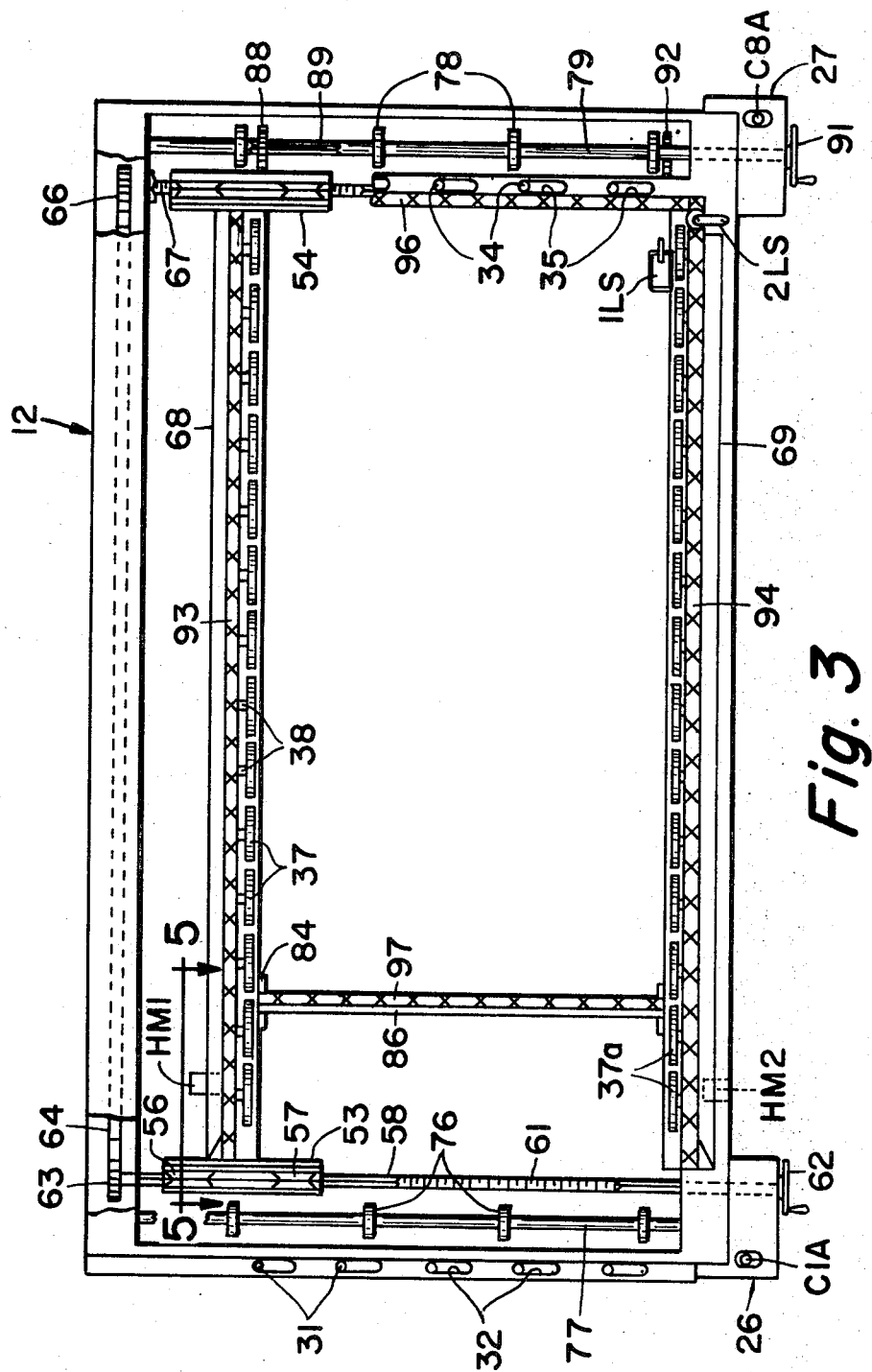
FIG. 3 is a view similar to FIG. 2 but of the lower part of the apparatus of FIG. 1 and taken generally along line 3—3 of FIG. 1.

Referring now to FIGS. 1, 3 and 4, lower or bottom frame member 12 of the apparatus is an open-bottomed frame member including a plurality of hollow legs such as 26, 27 and 28 which support the main portion of the frame member a distance above the floor upon which the bottom of such legs rest. A pressurized fluid motor means comprising a fluid cylinder C1 (FIG. 4) and an associated piston rod C1A (FIGS. 1, 3 and 4) is disposed within leg 26 and is pivotally connected at the bottom of cylinder C1 to the bottom of leg 26 as by a suitable lug C1B. As illustrated in FIG. 4, the otherwise free end of piston rod C1A is pivotally connected to upper member 13 at the lefthand front corner of such member (viewing FIG. 1). As will be readily understood by those skilled in the art, an arrangement similar to that just discussed, and including a piston rod C8A, is provided at the right-hand end of the apparatus (viewing FIG. 1). As is also apparent and as will be further discussed hereinafter, the motor means just described operate to raise and lower member 13, that is, to actuate one of the members 12 and 13 between an open relationship and a hermetic sealing relationship with the other or, rather, a panel disposed therein as hereinafter discussed.

As best illustrated in FIGS. 3 and 4, a gating means comprising a series of stops such as 31 are pivotally connected intermediate their ends to the left-hand end of frame member 12 and with the upper ends of such stops extending through associated slots such as 32 (FIG. 3) provided in said end of the frame member. An actuating rod 33 (FIG. 4) is pivotally connected to each of the stops, such as 31, at the lower ends thereof and one end of such rod is pivotally connected to the piston rod C6A of a pressurized fluid motor means comprising a fluid cylinder C6 and the associated piston rod C6A. When, as hereinafter further discussed in an operational example of the invention, piston rod C6A is retracted within its cylinder C6, actuating rod 33 is also retracted to lower the stops such as 31 through their associated slots such as 32.

Another gating means similar to that just discussed is also provided at the opposite end of member 12 and includes a series of stops such as 34 and associated slots such as 35 (FIG. 3). Such stops are also actuated between raised positions and lowered positions in a manner similar to that just described, such actuation being performed by a pressurized fluid motor means comprising a fluid cylinder C2 and associated piston rod C2A to be discussed hereinafter in an operational example of the invention set forth in conjunction with FIGS. 11 and 12.

As shown in FIG. 4, a limit switch designated 4LS is mounted in such a relationship to cylinder C1 that such switch is actuated to open and close its electrical circuit controlling contacts according as said cylinder depresses the actuating rod of the limit switch to varying degrees during the opening and closing of members 12 and 13. Such actuation of the actuating rod of limit switch 4LS results from various degrees of tilting of cylinder C1 during said opening and closing operations as will be readily apparent. Limit switches such as 4LS are well known and such switch and the actuation of its electric circuit controlling contacts will be further discussed later in the operational example of the apparatus.

Figure 5:
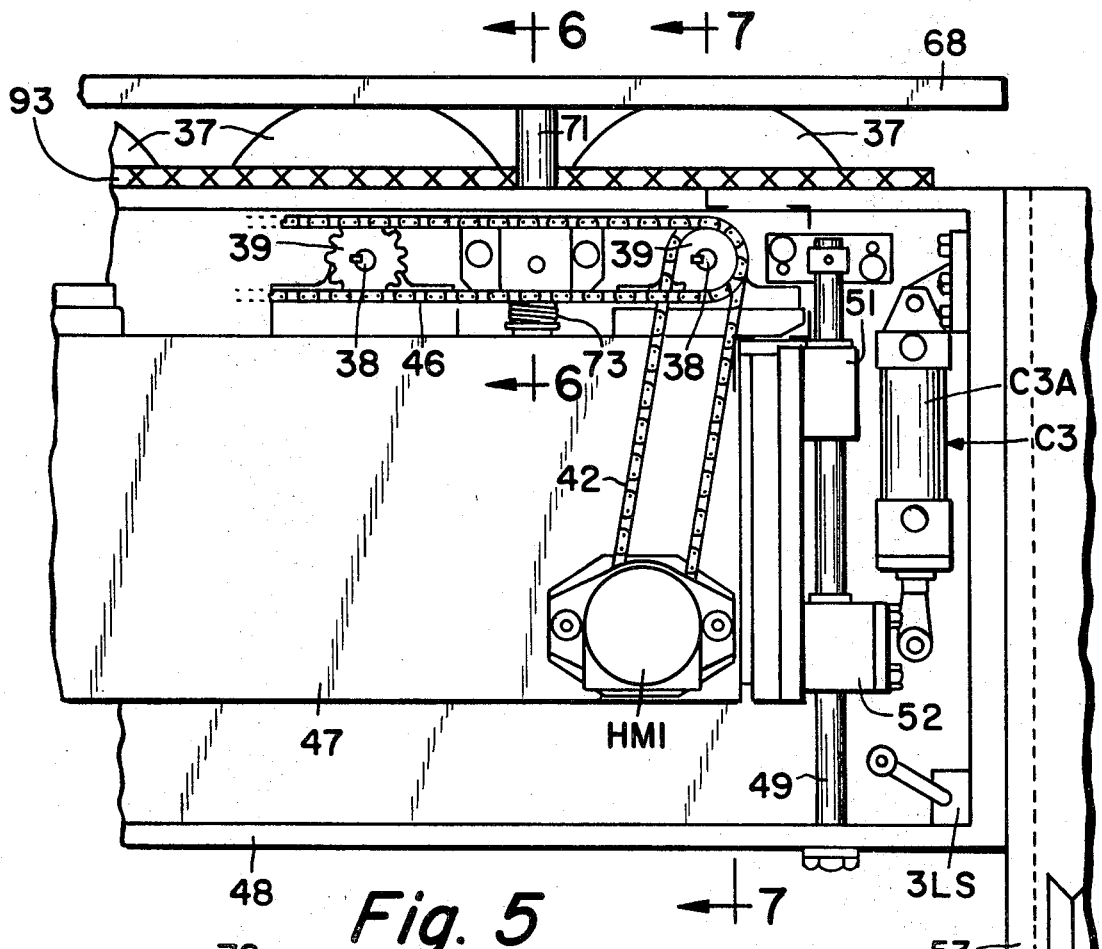
FIG. 5 comprises a detailed view of part of the apparatus of FIG .1, such view being taken generally along line 5—5 of FIG. 3.
Figure 7:
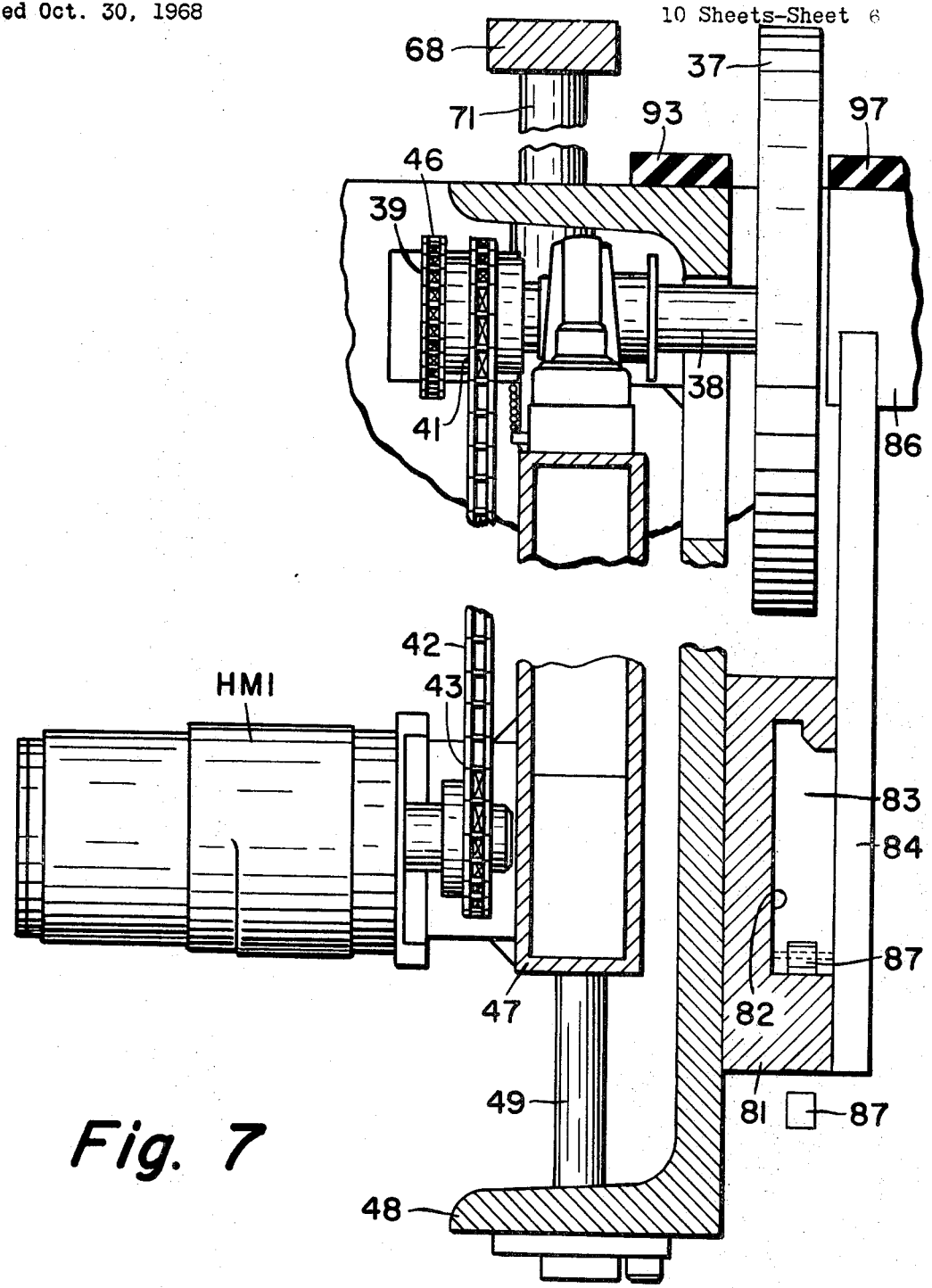
FIG. 7 is a view similar to FIG. 6 and taken generally along line 7—7 of FIG. 5.

A first succession of rollers such as 37 (FIGS. 1, 3, 4, 5 and 7) are provided towards the rear of the inside of frame member 12 and (viewing FIG. 1) extend from near the left-hand end of such frame member towards a location near the right-hand end of such member. Such left and right-hand ends of frame member 12 are, as hereinafter further discussed, panel entrance and exit ends, respectively, of apparatus 11. As best illustrated in FIGS. 5 and 7, the rollers such as 37 are mounted on one end of axles such as 38 and the other ends of such axles are provided with sprocket wheels such as 39 for driven rotation of the associated rollers 37. The axle 38 of the left-hand one of the rollers such as 37 is provided with an additional sprocket wheel 41 (FIG. 7) and an endless chain 42 extends in a loop about sprocket wheel 41 and a sprocket wheel 43 which is provided on the otherwise free end of the drive shaft of a rotary pressurized fluid-driven motor HM1. Another endless chain 46 (FIG. 5) extends in a loop about said sprocket wheels such as 39 on the ends of said axles such as 38. By such arrangement, it will be apparent that the driven rotation of sprocket wheel 43 by motor HM1 will, in turn, impart similar rotation to said sprocket wheel 41, and, thereby, to the sprocket wheels such as 39 to drive the rollers such as 37 in a corresponding direction. The energization of motor HM1 will be discussed later, but it is pointed out at this point in the description that the rollers such as 37 are driven in a clockwise direction (viewing FIG. 1) by the energization of motor HM1.

Referring to FIGS. 5 and 7, the rollers such as 37, motor HM1 and the associated apparatus just discussed, are all mounted on the first support 47 which is in turn carried on a second channel-shaped support 48. At each end of support 48 there is provided a guide bar such as 49 each of which extends through suitable slide bearings such as 51 and 52 (FIG. 5) secured to the corresponding ends of said support 47. By such arrangement, support 47 and said apparatus supported thereby, including the rollers such as 37, are vertically movable within support 48 and frame member 12. The otherwise free end of teh piston rod of a pressurized fluid actuated motor C3, including a pressurized fluid cylinder C3A, is connected to slide bearing 52 at the righthand end of support 47 and the closed end of cylinder C3A is connected to one end of the aforesaid channel-shaped support 48 as illustrated in FIG. 5.

It is pointed out that the second or opposite ends of supports 47 and 48 are similarly provided with a pressurized fluid motor C7, including a fluid cylinder C7A, by which such opposite end of support 47 can be actuated in conjunction with the first-mentioned end of such support to vertically raise and lower support 47 within support 48 and, thereby within frame member 12. This will be further discussed hereinafter.

The first and second outer ends of support 48 are secured, as by welding for example, to trucks 53 and 54, respectively (FIG. 3) each of which include a pair of grooved wheels such as 56 and 57 (FIGS. 3, 4 and 5) which ride on inverted V-shaped tracks such as 58 (FIGS.

3 and 4). Thus, support 48 and its supported apparatus can be moved between the front and rear of frame member 12, the grooved wheels of said trucks 53 and 54 riding on the tracks such as 58 during such movements. A truck actuating rod 61 is threaded along a substantial part of its length and extends from the front of frame member 12 directly above track 58 and through cooperating threads in truck 53 to the rear of such frame member. Such rod also extends through suitable bearings supported on the front and rear walls of member 12 and a crank wheel 62 is keyed to the front end of rod 61 for manual rotation of such rod. A sprocket wheel 63 is keyed to the rear end of rod 61 and an endless chain 64 extends about sprocket wheel 63 and is also looped about a sprocket wheel 66 provided on the rear end of a threaded, truck-actuating rod 67 (FIG. 3) which extends through cooperating threads provided in truck 54. By such arrangement the manual rotation of rod 61 causes equal and similar rotation of rod 67, and resultant equal and similar movement of trucks 53 and 54 between the front and rear of frame member 12. Thus, the position of the succession of rollers such as 37 can be varied between the front and rear of frame member 12.

Another or a second succession of rollers such as 37A (FIGS. 3 and 4) are located adjacent the front of frame member 12 and extend from the previously-mentioned panel entrance end of such apparatus 11 to said panel exit end thereof. The second succession of rollers such as 37A are supported in a manner similar to the first-mentioned succession of rollers such as 37 and are also vertically movable within frame member 12. Such second succession of rollers is not movable between the front and rear of member 12 since, as hereinafter discussed and as is readily apparent, it is only necessary that one of such successions of rollers be so movable for adjustment of apparatus 11 for accommodation of panels of varying widths. As also set forth hereinafter, a pair of pressurized fluid motors including fluid cylinders C3B and C7B, and their associated piston rods, are provided for vertical movement of the succession of rollers such as 37A. Furthermore, a second rotary pressurized fluid driven motor HM2 (FIG. 3) is connected to the rollers such as 37A through suitable chain drives for driven rotation thereof in a direction corresponding to the direction of rotation of the succession of rollers such as 37.

Figure 6:
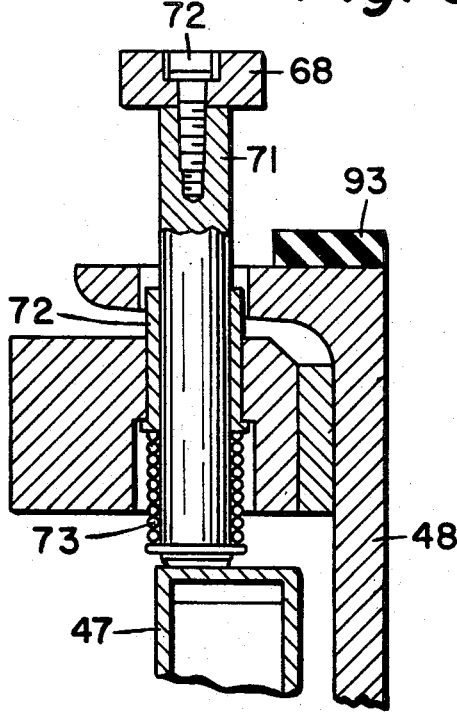
FIG. 6 comprises a view on an enlarged scale and taken generally along line 6—6 of FIG .5.

Panel guide rails 68 and 69 are associated with each of said successions of rollers such as 37 and 37A, respectively, (FIGS. 1, 3 and 4). As best illustrated in FIGS. 5, 6 and 7, each such panel guide rail such as 68 is supported on the upper ends of support pedestals such as 71 and are secured thereto as by suitable screws such as 72 (FIG. 6). Each pedestal such as 71 extends through a hole provided in the respective support such as 48 (FIG. 6) and through a bushing such as 72 which also extends through the associated hole provided in the respective support such as 48. A spring such as 73 bears against the bottom of each respective bushing such as 72 and against the top of the respectively-associated support such as 47. By such arrangement when each of said successions of rollers such as 37 and 37A are in their raised positions, the respective springs such as 73 are compressed by the supports such as 47 to raise the panel guide rails such as 68 and 69 to panel guiding poitions. When, however, the successions of rollers 37 and 37A are lowered by moving the respective support members such as 47 downwardly, the springs such as 73 expand to cause lowering of each respective panel guide rail such as 68 and 69.

A first set of freely-rotatable wheels such as 76 are supported on an axle 77 at the panel entrance end of member 12 and a second similar set of wheels such as 78 are supported on an axle 79 at the panel exit end of said member. Such sets of wheels are provided for convenient conveyance of panels to the driven successions of rollers such as 37 and 37A as is believed readily apparent.

A limit switch 1LS (FIG. 3) is provided near the panel exit end of member 12 in such a location as to be actuated by a panel as it approaches the previously-mentioned stops 34. Another limit switch 2LS (FIGS. 1 and 3) is located slightly beyond limit switch 1LS and is actuated when a panel reaches said stops such as 34. The actuation of such limit switches operates electric circuit controlling contacts in the usual manner and as hereinafter discussed in detail. Referring to FIG. 5, there is also provided a limit switch 3LS which is actuated by bearing 52 when support 47 is moved to its lowered position. Such limit switch also includes electric circuit controlling contacts which are operated by the actuation of the limit switch and are discussed hereinafter in an operational example of the invention.

As illustrated in FIG. 7, a track or guide 81 is secured as by welding to the front side of support 48 and extends along the length of such support below the rollers such as 37. Such guide or track 81 includes a channel 82 in which is provided a slide block 83 to which is fastened a carriage 84 (FIGS. 1, 3 and 7) for a first end of a panel support 86 which extends across the width of member 12 adjacent the top of such member as best illustrated in FIG. 1. The second end of panel support 86 is supported adjacent the front end of member 12 by an apparatus arrangement similar to that just described and which is associated with the support for the front rollers such as 37A previously discussed.

An endless chain 87 is connected with the above-mentioned slide block 83 and loops about cooperating drive sprocket wheels such as 88 (FIG. 3) provided at the panel entrance and exit ends of member 12. At the right-hand end of member 12 there is provided a drive rod 89 for the sprocket wheel 88 at such end of member 12. Sprocket wheel 88 is keyed to drive rod 89 so as to be rotated in conjunction with rotation of such rod but is slidably movable along the length of such rod. A hand crank 91 is connected to the front end of drive rod 89 for manual rotation of such rod. Another sprocket wheel 92 (FIG. 3) is mounted on drive rod 89 for driven rotation thereby and near the front of member 12. Another endless chain loops about sprocket wheel 92 and extends along the inside of the front of member 12 and about another sprocket wheel (not shown) at the panel entrance end of member 12. Such other chain is connected to the slide block of the above-mentioned apparatus arrangement provided for the support of the second end of panel support 86 and in a manner similar to that illustrated for chain 87 and slide block 83 shown in FIG. 7. It will be apparent from the apparatus arrangements just described that panel support 86 can be moved longitudinally within member 12 by the manual rotation of crank 91 driving said chains connected to the slide blocks such as 83. That is, panel support 86 can be moved between the panel entrance and exit ends of member 12 by the cooperative driving of said chains by the rotation of drive rod 89 and the resultant sliding movement of the slide block such as 83 within the channels such as 82 of their associated guides or tracks such as 81 (FIG. 7). Thus, member 12 can be adjusted to accommodate panels of different lengths. This will be further discussed hereinafter.

Member 12 can also be adjusted to accommodate panels of varying widths. This is accomplished by moving the previously-discussed associated roller supports 47 and 48 (FIG. 7) between the front and rear of member 12 by the rotation of hand crank 62 as previously described. However, since the crosswise panel support 86 is of a fixed length, such panel support must be changed to one of a different length each time panels of different widths are to be accommodated for testing thereof by apparatus 11. Another crosswise panel support 95 is provided adjacent the panel exit end of member 12 and is also of a fixed length. This member can remain of fixed length regardless of panel widths being tested in apparatus 11.

Therefore, as is readily apparent, the number of different width panels which may be tested by apparatus 11 is limited by the number of different length panel supports such as 86 which are available for the use in the apparatus.

Referring to FIGS. 1, 3, 4 and 7, resilient pads 93 and 94 are provided along the longitudinal top surfaces of member 12 for support of panels being tested. Similarly, a resilient pad 96 is provided along the top surface of panel support 95 which is located adjacent the previously-mentioned stops such as 34 at the panel exit end of apparatus 12 for support of panels at such panel exit end. Also, each of the interchangeable panel supports such as 86 is provided with a resilient panel support pad such as 97 extending the length of each respective one of such panel supports. Thus, panels to be tested can be supported about the peripheral regions of the bottom surfaces thereof by resting on said resilient support pads such as 93, 94, 96 and 97.

Figure 8:
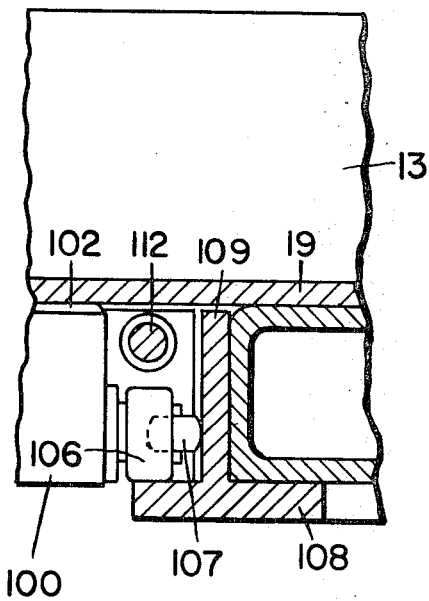
FIG. 8 is a view of a detail of the apparatus of FIG. 2 and taken generally along line 8—8 of FIG. 2.
Figure 9:
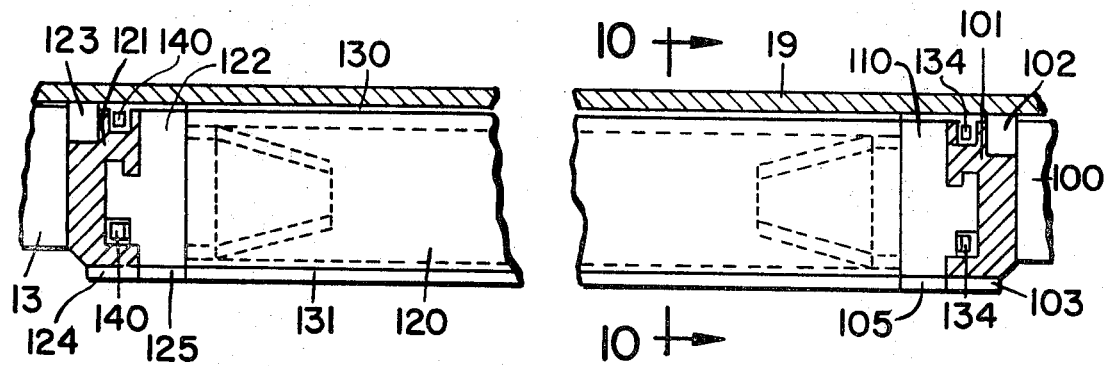
FIG. 9 comprises a detailed view of the apparatus of FIG. 2 taken generally along line 9—9 of FIG. 2.
Figure 10:
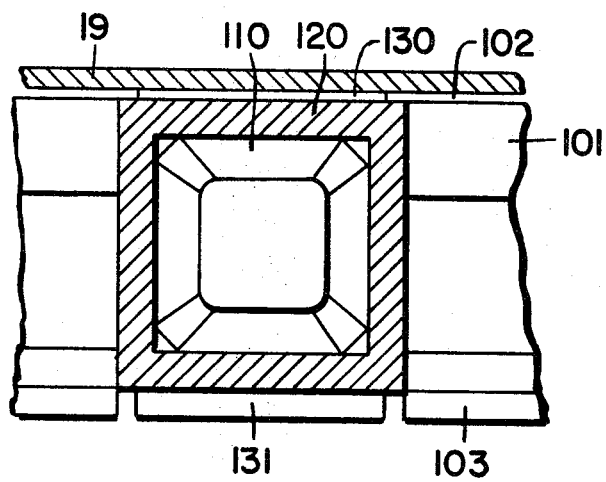
FIG. 10 comprises a cross-sectional view of the apparatus of FIG. 9 and taken generally along line 10—10 of FIG. 9.

Referring now to FIGS. 8 and 9 taken in conjunction with FIGS. 1, 2 and 4, an adjustable longitudinal pressurized chamber sealing beam 100 is provided within the previously-discussed pressure chamber 21 in upper member 13. As illustrated in FIGS. 9 and 10, there is secured to the front face of beam 100, as by welding thereto, a track or guide 101 which includes a channel in which there is disposed a carrier 110 for a hollow cross beam 120 which extends across part of the width of pressure chamber 21. A resilient sealing pad 102 is provided in a recess in track or guide 101 and provides hermetic sealing between beam 100, track or guide 101 and upper plate 19 of pressure chamber 21. Track 101 also includes on its lower surface a resilient hermetic pad 103, and carrier 110 includes on its lower surface a similar pad 105. Such pads provide for hermetic sealing between such lower surfaces and the portion of the upper surface of a tested panel adjacent the rear edge of such panel.

Each end of beam 100 is provided with a set of rollers such as 106 and 107 (FIG. 8) which roll upon and against bottom and side guides such as 108 and 109, respectively. Thus, beam 100 and its associated guide or track 110 are movable between the front and rear of member 13. A drive rod 111 (FIGS. 1, 2 and 4) which is threaded for a substantial part of its length extends between the front and rear of member 13 and through cooperative threads provided in the lefthand end of beam 100. Another similarly threaded drive rod 112 (FIGS. 1, 2 and 8) extends between the front and rear of member 13 and through cooperative threads provided in the righthand end of beam 100. Sprocket wheels 113 and 114 are keyed to the rear ends of drive rods 111 and 112, respectively, and an endless chain 116 (FIG. 2) extends in a loop about such sprocket wheels. A hand crank 117 is keyed to the front end of drive rod 111 and the manual rotation of such crank causes corresponding rotation of drive rods 111 and 112 to move beam 100 and track 101 between the front and rear of member 13.

Another guide or track 121 (FIG. 9) is secured to the front of member 13 within pressure chamber 21 and a carrier 122 is disposed within a channel provided in such guide or track. A resilient sealing pad 123 is provided in a recess in track or guide 121 and provides hermetic sealing between such guide and upper plate 19 of pressure chamber 21 (FIG. 9). Guide or track 121 also includes on its lower surface a resilient hermetic pad 124 (FIG. 4) and carrier 122 includes on its lower surface a similar pad 125 (FIGS. 4 and 9). Such pads provide for hermetic sealing between such lower surfaces and the portion of the upper surface of a tested panel adjacent the front edge of such panel.

The previously-mentioned hollow cross beam 120 is supported on carries 110 and 122 as illustrated in FIG. 9. Such cross beam includes on its top and bottom surfaces resilient sealing pads 130 and 131, respectively. When the cross beam 120 is supported as illustrated in FIG. 9, pad 130 is compressed between beam 120 and plate 19 of pressure chamber 21 to provide hermetic sealing therebetween. Pad 131 on the bottom surface of beam 120 provides for hermetic sealing between such beam and the top surface of the trailing edge of a panel being tested.

An endless chain 134 (FIGS. 1, 2 and 9) extends in a loop about sprocket wheels 135 and 136. Sprocket wheel 135 is rotatably supported on beam 100 near the lefthand end thereof. Sprocket wheel 136 is rotatably supported on beam 100 adjacent the right-hand end thereof and is also keyed to a drive rod or axle 137 (FIGS. 1 and 2). Wheel 136 is slidable along the length of drive rod 137 but is keyed against rotation thereon. As shown in FIG. 9, the lower part of chain 134 is secured to carrier 110 for movement of such carrier.

An arrangement similar to that just described is provided in pressure chamber 21 adjacent the front of member 13 and includes an endless chain 140 (FIGS. 2 and 9) and sprocket wheels 141 and 132. Sprocket wheel 142 is keyed to drive rod 137 and the lower part of chain 140 is fastened to carrier 122 as shown in FIG. 9 for movement of such carrier. A hand crank 143 is provided on the front end of drive rod 137 as shown in FIGS. 1 and 2. By such arrangement it will be apparent that the rotation of crank 143 causes equal and corresponding movements of chains 134 and 140 and, thereby, carriers 110 and 122 to move cross beams such as 120 between the panel entrance and exit ends of member 13. Adjustments for different lengths of panels to be tested can thus be made.

Near the panel exit end of member 13 there is provided a cross beam 146 which is similar to beam 120 and includes on its bottom surface a resilient pad 147 for hermetic sealing against the top surface of the leading edge of a panel being tested. Beam 146 is supported in pressure chamber 21 on supports similar to carriers 110 and 122 but which are affixed in the pressure chamber.

It is pointed out that beams 120 and 146 are readily removable and interchangeable with different length similar beams. This arrangement, together with the corresponding similar interchangeability of the lower corresponding cross beam 86, allows for corresponding adjustability of members 12 and 13 to accommodate different widths of panels to be tested. The accommodation of such different width panels is, of course, accomplished by corresponding adjustment of the complemental hermetic sealing means in upper member 13 and the panel support means in lower member 12.

Figure 11:
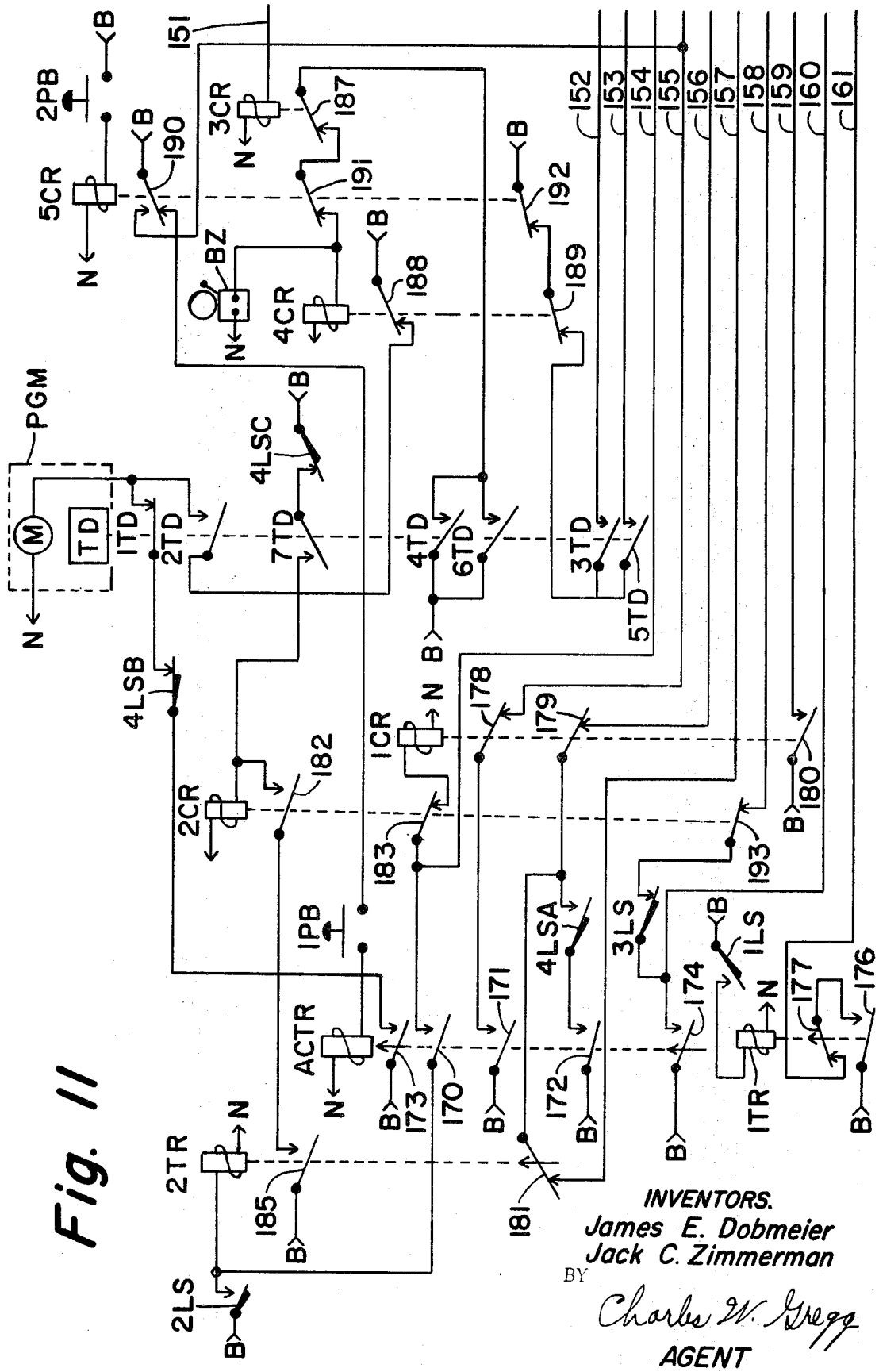
FIGS. 11 and 12 comprise substantially schematic diagrams of electrical control circuits and components, and pressurized fluid components and conduits employed in the invention.
Figure 12:
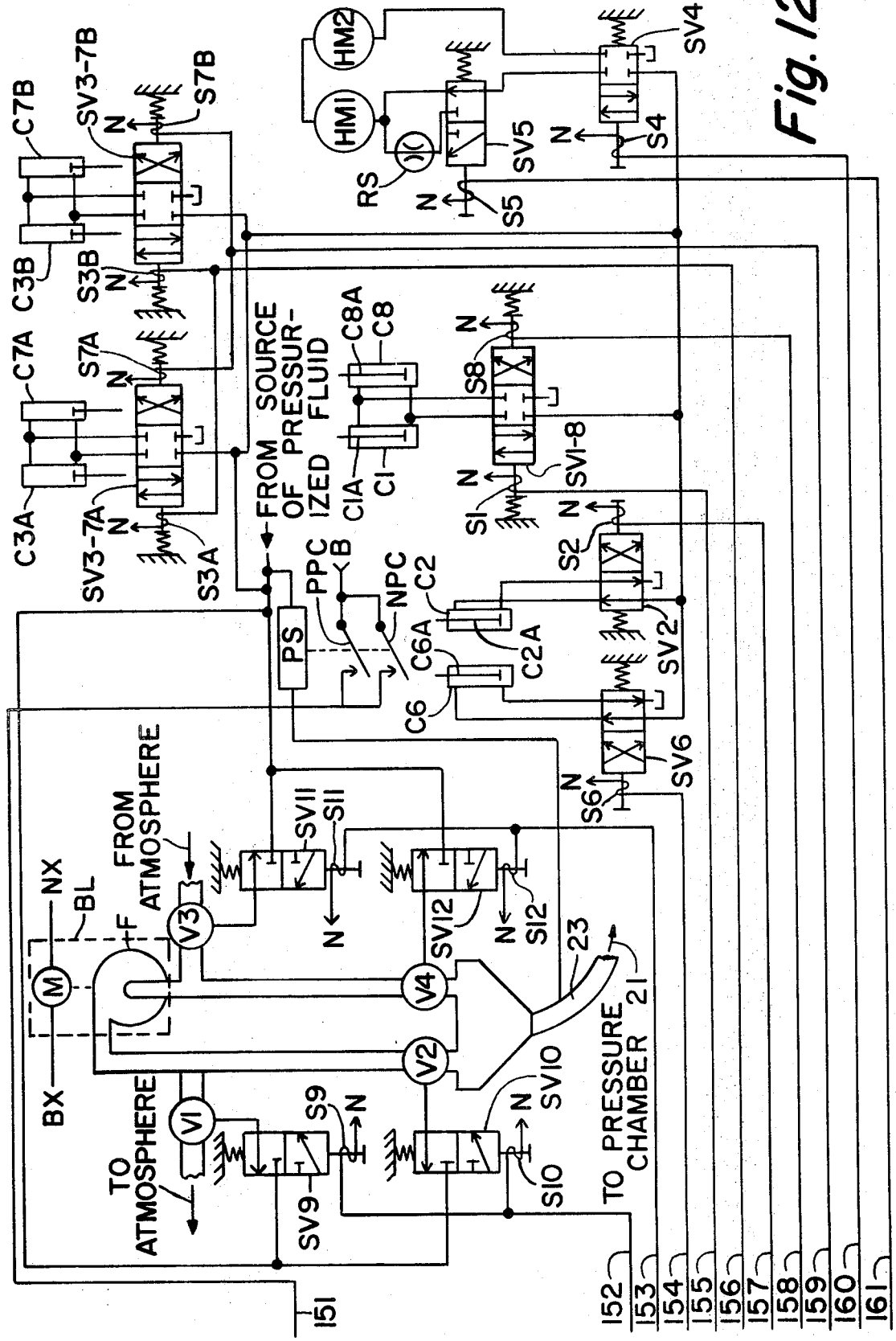

FIGS. 11 and 12 of the drawings when arranged from left to right in numerical order comprise a schematic electric circuit diagram of the electrical control circuits employed in the invention. In addition, pneumatic and hydraulic diagrams and apparatus employed in the invention are schematically illustrated in FIG. 12.

Referring first to FIG. 11, there is shown a programmer PGM including a timing drum designated TD and a drive motor M for the timing drum. Such programmers are well known and the energization of motor M drives timing drum TD to actuate electrical circuit controlling contacts 1TD through 7TD in the usual manner and in a time sequence hereinafter discussed. There is also shown in FIG. 11 a pair of manually actuable push buttons 1PB and 2PB which, when manually depressed, close electrical circuit controlling contacts. When such push buttons are manually depressed, they remain in such actuated positions until they are pulled to again open their electrical contacts. Such a type fo push button is commonly known as a stick push button and is also well known.

There is also shown in FIG. 11 a series of electrically actuated control relays designated 1CR through 5CR which actuate electric circuit controlling contacts between open and closed positions in the usual manner. In addition, a series of eletrically operated relays 1TR, 2TR and ACTR are illustrated in FIG. 11. Such relays are time delay relays and include electric circuit controlling contacts which are actuated immediately upon the energization of the control windings of the relays as well as contacts which are actuated only after a predetermined time delay following the energization of such control windings. The delayed actuation of these latter contacts is indicated by arrows drawn through the movable portions of such contacts and pointed in the direction in which such contacts are slow to be actuated.

An electrically energized warning buzzer or bell BZ is shown in FIG. 11 and, at times, gives an audible warning as hereinafter further discussed. Electrical circuit controlling contacts of the previously-mentioned limit switches 1LS through 4LS are also shown in FIG. 11 and their operation will be understood following the operational example hereinafter set forth.

A series of electrical conductors designated 151 through 161 are shown extending between FIGS. 11 and 12, and it will be understood that the conductors which are similarly designated in each such drawing figure are the same conductors.

There is shown in FIG. 12 a series of electric solenoid actuated fluid-flow control valves designated SV1–8, SV2, SV3–7A, SV3–7B, SV4, SV5 and SV6. Such types of valves are well known and control the supply of pressurized fluid to the cylinders C1, C2, C3A, C3B, C6, C7A, C7B and C8 of the previously-discussed reciprocative pressurized fluid motors and to the rotary pressurized fluid motors HM1 and HM2. There is also shown in FIG. 12 electric solenoid actuated fluid-flow control valves SV9 through SV12 which control the supply of pressurized fluid to compressed air flow control valves designated V1 through V4. Such air flow control valves will be discussed further hereinafter but are valves normally termed as "butterfly" valves and are a well-known type of valve.

A blower designated BL and including a fan F and associated drive motor M provides positive and negative pressures which are supplied to the previously-discussed pressure chamber 21 for testing of panels.

A suitable source of pressurized fluid, preferably hydraulic, is also provided but is not shown in the drawings for purposes of simplification thereof. A differential pressure switch PS has a first input connected to said source of pressurized fluid and a second input connected to the previously-mentioned conduit 23 through which the aforementioned positive and negative pressures are supplied to pressure chamber 21. Pressure switch PS controls normally open electrical circuit controlling contacts designated PPC and NPC each of which is actuated to a closed condition when, respectively, the positive and negative pressures supplied to chamber 21 are within ranges of such pressures for which such pressure switch is preset for the testing of the panels. Such differential pressure switches are also well known.

Suitable sources of electrical current are provided for the energization of the aforesaid electrical components such as the electric relays, motors, buzzer or bell BZ and solenoid actuated valves. However, for purposes of simplification of the drawings, such sources are not shown therein but their positive and negative terminals are designated B and N, and BX and NX, respectively, for corresponding terminals of direct and alternating sources of such current.

For an operational example of the invention, it will be assumed that upper or top member 13 is closed against lower member 12 of the apparatus before an initial startup of the testing of a series of panels of identical sizes. Under such conditions, members 12 and 13 have previously had their movable beams such as 48 and 100 adjusted to accommodate such a size of panels, such adjustment being made by manual operation of the hand cranks 62, 91, 117 and 143, and the use of corresponding complemental lengths of cross beams such as 86 and 120. The panels to be tested can, of course, be manually supplied to the entrance or lefthand end of the apparatus 11 but, for obvious economic reasons, apparatus 11 was constructed to individually receive and test each of a succession of similar panels supplied thereto from, for example, a conveyor which carries each such panel up to the entrance end of the testing apparatus and, if such apparatus is unoccupied by a previous panel of said succession, inserts the next panel of such succession into the testing apparatus. Such insertion is, of course, prevented by the previously-mentioned gating means including the stops such as 31 if the apparatus is still occupied by the next preceding panel of the succession of similar panels.

For startup of the apparatus, push button 1PB (FIG. 11) is manually depressed to close an energizing circuit to the control winding of relay ACTR. Relay ACTR is thus energized to immediately close its contacts 170, 171 and 172. Following the previously-mentioned predetermined time delay of relay ACTR, contacts 173 and 174 also close. The closure of contact 171 closes an energizing circuit for solenoid winding S1 of solenoid valve SV1–8 (FIG. 12) and such valve is actuated to supply pressurized fluid to cylinders C1 and C8 whose piston rods C1A and C8A are then actuated to raise the front of member 13 to the position illustrated in FIG. 1, that is, to an open panel-receiving condition of apparatus 11.

The opening of members 12 and 13 actuates limit switch 4LS to immediately open its contacts 4LSB and 4LSC (FIG. 11) and to subsequently close its contact 4LSA. Contact 172 of relay ACTR being closed at such time, energizing circuits for solenoid winding S2 of valve SV2, and solenoid windings S3A and S3B of valves SV3–7A and SV3–7B, respectively, are thereby closed. The energization of such solenoid windings causes such valves to be actuated to supply pressurized fluid to cylinder C2 to actuate piston rod C2A to raise stops 34 to a panel blocking position, and to cylinders C3A, C7A, C3B and C7B to cause the piston rods of such cylinders to raise the rollers such as 37 and 37A to panel conveying positions.

Following the closure of contact 174 of relay ACTR, a circuit is closed to energize solenoid winding S4 of valve SV4 and such valve is thereby actuated to supply pressurized fluid to rotary motors HM1 and HM2 for rotation of such motors and corresponding rotation of the rollers such as 37 and 67, respectively. A panel to be tested and having a leading end or edge thereof inserted in the entrance end of apparatus 11 at such time will be carried or moved by the rollers such as 37 and 37A between guides 68 and 69 and towards the exit end of the apparatus.

When the leading edge of the above-mentioned panel reaches limit switch 1LS, such switch is actuated to close its electrical circuit controlling contact (FIG. 11) and an energizing circuit for relay 1TR (FIG. 11) is thereby closed. Contact 176 of relay 1TR closes immediately upon the energization of the control winding of the relay but contact 177 of such relay remains closed for the preset time delay of the relay. Such operation momentarily closes a control circuit for the solenoid wniding S5 of valve SV5 and the pressurized fluid being supplied to rotary motors HM1 and HM2 through valve SV4 is momentarily diverted to flow through a restriction RS to such motors. This operation causes a momentary slowing of the rotary motors and the panel is more slowly conveyed towards the stops 34 of apparatus 11.

Just prior to the time the leading edge of the panel reaches said stops 34, limit switch 2LS is actuated by the leading edge of the panel and a circuit to the control winding of relay 1CR is closed. Such relay is thereby energized and opens its contacts 178 and 179 to open the energizing circuits for the solenoid winding S1 of valve SV1–8 and solenoid windings S3A and S3B of valves SV3–7A and SV3–7B, respectively. The actuation of limit switch 2LS also closes an energizing circuit to the solenoid winding S6 of valve SV6. Piston rod C6A of cylinder C6 is thereby actuated to raise the stops such as 31 of the gating means at the panel entrance end of the apparatus. A subsequent panel of said succession of panels will thereby be prevented from entering the apparatus.

The above-mentioned energization of relay 1CR also closes contact 180 which energizes the circuits to solenoid windings S7A and S7B of valves SV3–7A and SV3–7B to supply pressurized fluid to cylinders C3A, C3B, C7A and C7B to lower the rollers such as 37 and 37A. This causes the panel in the apparatus to be lowered onto the pads such as 93 and 94 of member 12. The lowering of rollers such as 37 causes actuation of limit switch 3LS and an energizing circuit to solenoid winding S8 of valve SV1–8 is thereby closed. Piston rods C1A and C8A of cylinders C1 and C8 are thereby actuated to lower the member 13 downwardly against member 12 and the panel therein. Contact 181 of relay 2TR subsequently opens to deenergize solenoid winding S2 of valve SV2 and such valve is reactuated to cause cylinder C2 to lower the stops such as 34 at the panel exit end of the apparatus.

The closing of members 12 and 13 actuates limit switch 4LS to open its contacts 4LSA and 4LSC and close its contact 4LSB. The closure of contact 4LSB closes an energizing circuit to motor M of programmer PGM to drive such programmer. Such circuit includes contact 1TD of the timing drum of the programmer. Subsequently, contact 2TD of timing drum TD closes to maintain energy to motor M of programmer PGM. Contact 1TD of the timing drum then subsequently opens.

Figure 13:
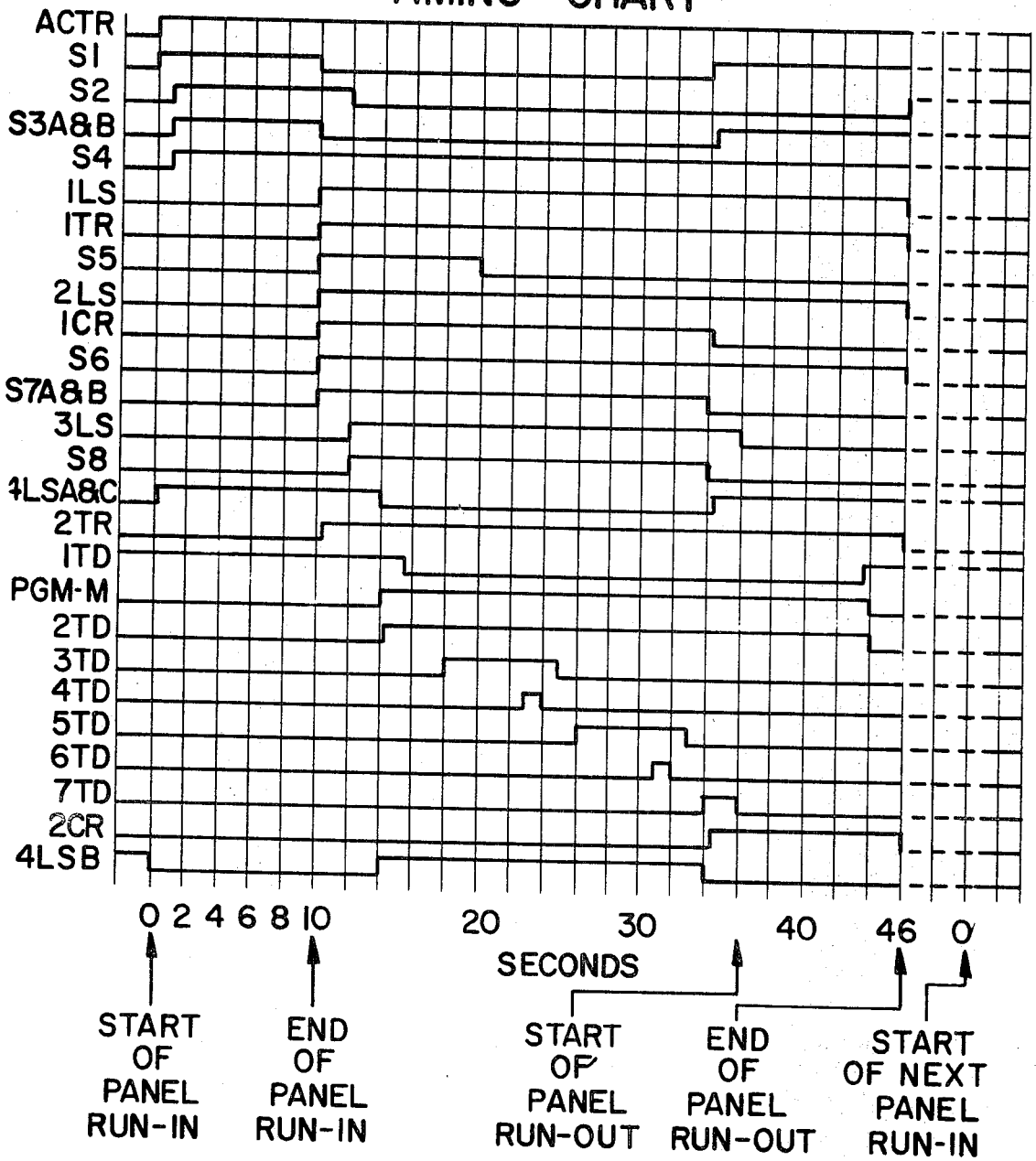
FIG. 13 is a timing chart illustrating a time sequence of actuation of the control apparatus employed in the invention.

The above-described sequence of actuation of the electrical and pressurized fluid components as well as the limit switches will best be understood by reference to the timing chart of FIG. 13 of the drawings. The sequence of actuation of the contacts 1TD through 7TD of timing drum TD will also best be understood by reference to said timing chart.

Following the start of the driving of timing drum TD of programmer PGM as above described, contacts 3TD through 7TD of such drum are sequentially closed for the periods of time indicated in the timing chart of FIG. 13. The actuation of the contacts 3TD and 5TD energizes solenoid windings S9 through S12 of pressurized fluid valves SV9 through SV12, respectively. Such valves, in turn, actuate valves V1, V2, V3 and V4 to alternately supply positive and negative pressures to pressure chamber 21 in member 13 to test the panel therein as discussed below.

It is pointed out that valves V1 and V3 are normally open valves while valves V2 and V4 are normally closed. Valves V1 and V3 are actuated to closed conditions when valves SV9 and SV11 are actuated by the energization of solenoid windings S9 and S11, respectively. Similarly, valves 2 and V4 are actuated to open conditions when valves SV10 and SV12 are actuated by the energization of solenoid windings S10 and S12, respectively.

Under the normal condition of the apparatus as in FIG. 12, fan F of blower BL is merely circulating air from atmosphere to return it to atmosphere. However, upon the closure of contact 3TD of timing drum TD during the timing cycle of programmer PGM, solenoid windings S9 and S10 are energized and valves V1 and V2 are, thereby, actuated to closed and open conditions, respectively. Such actuation supplies air from atmosphere to pressure chamber 21 for flexing and testing of the panel therein. Upon the subsequent opening of contact 3TD and the closing of contact 5TD of timing drum TD of programmer PGM, valves V1 and V2 return to their original conditions and valves V3 and V4 are actuated to closed and open conditions, respectively. This causes fan F to draw air from conduit 23 and pressure chamber 21 and blow such air to atmosphere. Thus, at such time, vacuum or negative pressure is supplied to pressure chamber 21 for the flexing and testing of the panel therein.

Following the testing of the panel as discussed above, contact 7TD of programmer PGM becomes closed and an energizing circuit for relay 2CR is closed. The energization of such relay causes it to close a holding circuit over its own contact 182 and such relay then remains energized until relay 2TR later becomes deenergized by the opening of the contact of limit switch 2LS. The energization of relay 2CR also opens at its contact 183 the energizing circuits for relay 1CR and solenoid winding S8 of valve SV1–8. Relay 1CR closes its contacts 178 and 179 and opens its contact 180. The energization of relay 2CR also opens contact 184 of that relay. Such operation opens the control circuits to solenoid windings S8, and S7A and S7B, and closes the control circuits to windings S1, and S3A and S3B. Cylinders C1 and C8 are thereby actuated to open members 12 and 13, and cylinders C3A, C7A, C3B and C7B are actuated to raise the rollers such as 37 and 37A.

The raising of rollers such as 37 and 37A causes the panel just tested to be conveyed by such rollers out of the apparatus and onto a suitable conveyor or any other similar device at the exit end of the apparatus. Contacts 1TD and 2TD of timing drum TD of programmer PGM close and open, respectively, and motor M of such programmer is deenergized in preparation for another sequence of operations of the programmer and its timing drum TD. When the panel leaves the exit end of the apparatus, limit switches 1LS and 2LS are actuated to open their contacts, and relays 1TR and 2TR are actuated to open their contacts 185 and 176, respectively. The opening of contact 185 of relay 2TR opens the holding circuit for relay 2CR which opens contact 182 of such relay to further interrupt such holding circuit. The opening of the contact of limit switch 2LS also opens the circuit to solenoid winding S6 of valve SV6 and cylinder C6 is actuated to lower the stops such as 31 at the panel entrance end of the apparatus. The release of relay 2TR also closes at contact 181 of that relay the energization circuit to solenoid winding S2 of valve SV2 to cause cylinder C2 to raise the stops such as 34 at the panel exit end of the apparatus. Another panel supplied to the entrance end of the apparatus can now be conveyed towards the exit end of the apparatus for testing thereof. It will be readily understood that the cycles of operation of the apparatus and control system such as that just described are thereafter repeated for each of said series of panels supplied to the apparatus.

Referring further to FIG. 12, pressure switch PS controls its contacts PPC or NPC to closed conditions whenever the positive or negative pressures, respectively, supplied to conduit 23 and, thereby, to pressure chamber 21 are within preset limits. The closing of either such contacts closes an energizing circuit to the control winding of relay 3CR (FIG. 11) which opens contact 187 of that relay. The opening of such contact prevents the energization of relay 4CR and the winding of bell or buzzer BZ when contact 4TD or 6TD of timing drum TD of programmer PGM closes during the timing cycle of such programmer. If, however, a panel breaks during the testing of such panel by the positive or negative pressures supplied thereto, the respective pressure in chamber 21 will be lost and contact PPC or NPC, respectively, will open. Relay 3CR is then released and, when the respective contact 4TD or 6TD of timing drum TD closes, buzzer BZ and relay 4CR become energized. Buzzer or bell BZ gives an audible indication that the panel has broken and that the apparatus may need to be cleaned out. The energization of relay 4CR opens, at contact 188 of such relay, the energization circuit to motor M of programmer PGM and the timing cycle of such programmer is interrupted. The energization of relay 4CR also opens at contact 189 of such relay, the respective energization circuits for solenoid windings S9 and S10, or S11 and S12 and the pressure then being supplied to pressure chamber 21 is terminated.

Upon hearing the audible warning given by buzzer or bell BZ, an operator depresses push button 2PB to energize relay 5CR. The energization of relay 5CR opens at contact 190 of such relay the energization circuit for relay ACTR which then releases. The closing of contact 190 of relay 5CR closes an energization circuit to solenoid winding S1 of valve SV1–8 to cause members 12 and 13 to open. The opening of contact 191 of relay 5CR terminates the energization of relay 5CR and buzzer BZ. The release of relay 4CR again closes the energizing circuit to motor M of programmer PGM and such programmer can finish its timing cycle. The energization of relay 5CR maintains the circuits to solenoid windings S9 and S10, or S11 and S12, open at contact 192 of such relay at such time. Following any cleaning out of the apparatus required, push button 2PB is pulled to release relay 5CR and reenergize relay ACTR for further panel testing operations of the apparatus.

Although there is herein shown and described only one embodiment of apparatus incorporating the invention disclosed, it will be understood that various changes and modifications may be made therein within the puriview of the appended claims without departing from the spirit and scope thereof.

What is claimed is:

1. Apparatus for concave and convex flexing of panels of a frangible material to test the ability of such panels to withstand a selected degree of such flexing without fracture or breakage thereof, such apparatus comprising;
   (a) a first frame member including a plurality of cross members spaced apart to define a planar area corresponding in shape to the planar surfaces of said panels and slightly less in area than the area of such surfaces, such cross members having substantially resilient pads for contacting one of said surfaces of each of said panels in the regions of such surface adjacent the outer periphery thereof;
   (b) a second member generally corresponding in size and shape to said first member and including a planar extending pressure chamber having one continuous planar wall and a periphery defined by a plurality of cross members similar and corresponding to the cross members of the first member, such first and second members being supported in such a relationship with each other that such members are cooperatively actuable to hermetically seal, against the pads on said cross members of the second member, the regions of the planar surfaces adjacent the outer peripheries of each of said panels when each respective panel is disposed between such cross members to provide the second planar wall of said pressure chamber;
   (c) an aeriform fluid conduit having a first end opening into said pressure chamber; and
   (d) means for selectively and alternately supplying positive and negative pressures to the second end of said fluid conduit and thereby to said pressure chamber.

2. Apparatus in accordance with claim 1 and in which the size of said pressure chamber is adjustable to accommodate, within preselected upper and lower limits, panels of various sizes.

3. Apparatus in accordance with claim 1 and in which said first and second members are supported in said relationship with each other by hinges connected to correpsonding sides of such members.

4. Apparatus in accordance with claim 3 and further including first motor means for actuating said first and second members between said hermetically sealing position and an open position.

5. Apparatus in accordance with claim 4 and further including,
   (a) a first and a second succession of rollers supported within said frame member opposite each other, the successive rollers of each such succession extending sequentially between panel entrance and panel exit ends of said first and second members;
   (b) second motor means for rotatably driving each of said successions of rollers in corresponding directions to convey each panel supplied to said entrance end between such end and said exit end of said members,
   (c) third motor means for lowering and raising each of said successions of rollers,
   (d) a first panel gating means at said exit end of said first and second members,
   (e) a second panel gating means at said entrance end of said first and second members,
   (f) fourth motor means for actuating said first panel gating means between open and closed conditions,
   (g) fifth motor means for actuating said second panel gating means between open and closed conditions,
   (h) an automatic control system for actuating said apparatus in a predetermined sequence; and
   (i) a manually actuable switch for energizing, when actuated, said second motor means to rotatably drive said rollers and activate said control system to sequentially:
      (1) actuate said first motor means to control said first and second members to said open position,
      (2) actuate said third and fourth motor means to raise said rollers and to control said first panel gating means to said closed condition, respectively,
      (3) actuate said fifth and third motor means to control said second panel gating means to said closed condition following the conveyance of the leading edge of a panel to said exit end of said members by said rollers and to then lower said rollers, respectively,
      (4) actuate said first motor means to control said first and second members to said hermetically sealing position,
      (5) actuate said fourth motor means to control said first panel gating means to said open condition,
      (6) actuate said pressure supply means to supply said pressures to said fluid conduit for selected periods of time,
      (7) actuate said first motor means to control said first and second members to said open position,
      (8) actuate said third motor means to raise said rollers,
      (9) actuate said fourth and fifth motor means to control said first and second panel gating means to said closed and open conditions, respectively, following the conveyance of the trailing edge of a panel to said exit end of said members by said rollers and thereby preparing the apparatus for receipt of the leading edge of another panel at the entrance end of said members, and
      (10) to repeat said sequence of actuations of said motor means for each said panel supplied to said entrance end of said first and second members.

6. Apparatus in accordance with claim 5 and further comprising means, actuated in response to said positive and negative pressures supplied to said pressure chamber, for interrupting the supply of the respective pressure when a panel, disposed as stated, is fractured by such pressure.

7. Apparatus in accordance with claim 6 and further comprising a second manually actuable switch for, when actuated, deactivating said control system.

8. Apparatus for concave and convex bowing of a panel of a frangible material to test whether such panel can withstand a selected degree of such bowing without fracture or breakage thereof; such apparatus comprising;
   (a) a lower frame member including a plurality of cross members spaced apart to define a planar area corresponding in shape to the planar surface of a panel to be tested and slightly less in area than the area of such surface, such cross members having on their upper surfaces substantially resilient pads for contacting the lower surface of said panel in the regions of such surface adjacent the outer periphery thereof;

(b) an upper member generally corresponding in size and shape to said lower member and including an open bottom but otherwise enclosed pressure chamber whose periphery is defined by a plurality of cross members similar and corresponding to the cross members of the lower member and having on their lower surfaces resilient and hermetic pads corresponding to the resilient pads on said upper surfaces of the cross members of the lower member, such upper and lower members being supported so as to be movable in relationship with each other to hermetically seal the peripheral regions of the upper surface of said panel between said pads on the cross members of the upper and lower members;

(c) an aeriform fluid conduit connecting with said pressure chamber, and (d) means for selectively and alternately supplying positive and negative pressures through said fluid conduit to said pressure chamber.

9. Apparatus in accordance with claim 8 and in which said upper and lower members are hinged to each other for support thereof in said movable relationship.

10. Apparatus in accordance with claim 9 and in which the spacing between cross members in each of said upper and lower members respectively is correspondingly adjustable to accommodate various sizes of panels to be tested.

11. Apparatus in accordance with claim 10 and further including first motor means for moving said upper and lower members in said relationship with each other and, thereby, between open panel conveying positions and closed panel testing positions.

12. Apparatus in accordance with claim 11 and further including, (a) a first and a second succession of panel conveying rollers supported within said lower member opposite each other, the rollers of each such succession extending sequentially from a panel entrance end toward a panel exit end of said members, and each such succession of rollers being actuable between lowered and raised positions;

(b) a first panel gating means at said entrance end of said members;

(c) a second panel gating means at said exit end of said members;

(d) second, third, fourth and fifth motor means;

(e) a manually actuable switch;

(f) and means responsive to the actuation of said switch for actuating said second motor means to rotatively drive said rollers, and for actuating said first, third, fourth and fifth motor means and said pressure supply means to sequentially:

(1) drive said upper and lower members to said open position, (2) drive said sets of rollers and said first panel gating means to said raised position and a closed condition, respectively, (3) drive said second panel gating means to a closed condition following the conveyance by said rollers of the leading edge of a panel to said exit end of said lower and upper members, and then drive said sets of rollers to said lowered position;

(4) drive said lower and upper members to said closed position, (5) drive said first panel gating means to an open condition, (6) actuate said pressure supply means to supply said pressures to said pressure chamber for selected periods of times, (7) drive said lower and upper members to said open position, (8) drive said sets of rollers to said raised position, (9) drive said first and second panel gating means to said closed condition and an open condition respectively following the conveyance by said rollers of the trailing edge of said panel to said exit end of said members, and

(10) for repeating said sequence of actuations of said motor means and said pressure supply means for each similar panel supplied to said entrance end of said lower and upper members.

13. Apparatus in accordance with claim 12 and further including means, actuated in response to said positive and negative pressures supplied to said pressure chamber, for interrupting each respective pressure when the panel being tested by such pressure is fractured thereby.

14. Apparatus in accordance with claim 13 and further including a second manually actuable switch for interrupting the actuation of said motor means and said supplies of pressure when such second switch is manually actuated.

References Cited

UNITED STATES PATENTS 2,825,223    3/1958    Conti.
3,050,991    8/1962    Madrzyk _____ 73—87

JERRY W. MYRACLE, Primary Examiner

U.S. Cl. X.R.

73—91